Jan. 4, 1949.  J. E. ANDREAU  2,458,130
FAIRING FOR AUTOMOBILE VEHICLES
Filed April 16, 1945
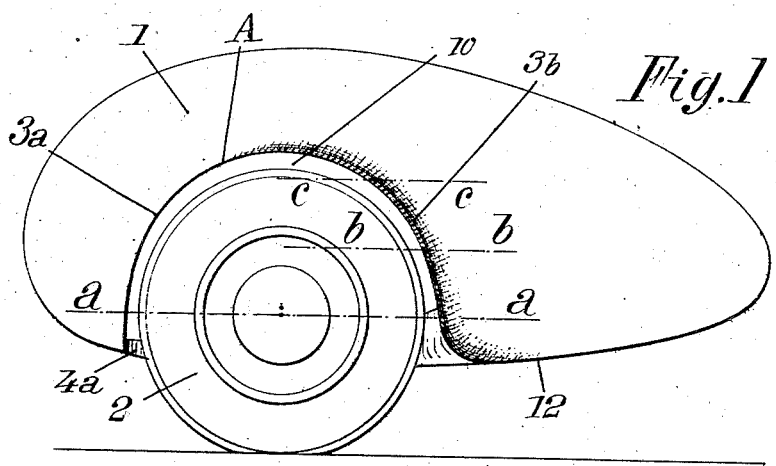
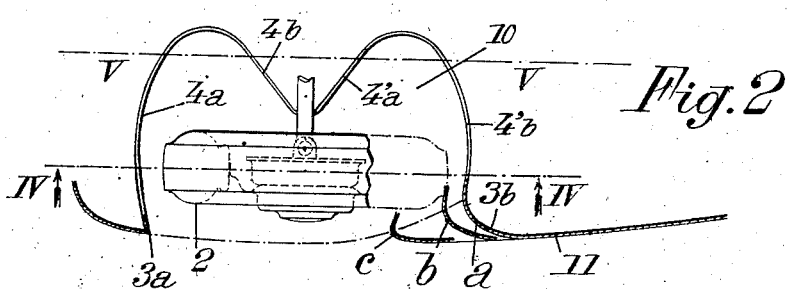
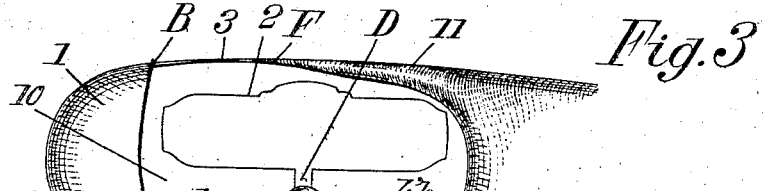
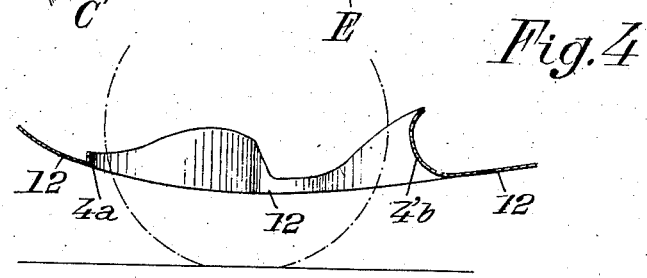
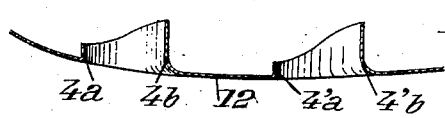
INVENTOR
Jean Edouard Andreau
BY Mock+Blum
ATTORNEYS Patented Jan. 4, 1949

2,458,130

UNITED STATES PATENT OFFICE 2,458,130

FAIRING FOR AUTOMOBILE VEHICLES

Jean Edouard Andreau, Daurat, near Leognan, France

Application April 16, 1945, Serial No. 588,480 In France March 30, 1942

Section 1, Public Law 690, August 8, 1946 Patent expires March 30, 1962

5 Claims. (Cl. 280—152)

The present invention relates to fairings for automobile vehicles.

In most of the constructions used at the present time, such fairings have their outer walls cut out in order to ensure accessibility to the wheel and, in the case of a swivel-mounted wheel (front wheel) to permit the pivoting thereof (for steering purposes). But these cut-outs produce considerable eddies and therefore greatly impair the aerodynamic qualities of the car.

It has already been suggested, in order to reduce the head resistance of these fairings, to close the gap thus cut out for the wheel by means of a removable plate of suitably curved shape.

In the case of rear wheels, that is to say wheels having their axes fixed with respect to the vehicle body, the plates were generally secured, through removable fixation means, to the remainder of the fairing. But in the case of swivel-mounted wheel (front wheels) a rather complicated device was sometimes provided so as to enable this closure plate to pivot simultaneously with the wheel.

But, in all cases, accessibility to the wheel is reduced. Furthermore, the closure plate increases the weight of the system. Furthermore, it is a cause of complication for the manufacturer of the car and of difficulties for the driver.

Finally, with this arrangement, the aperture that must necessarily be provided in the bottom wall of the vehicle for the passage of each wheel considerably increases the head resistance of the car.

The object of the present invention is to provide a fairing which obviates the amove mentioned drawbacks.

Other objects of my invention will result from the following detailed description of a specific embodiment, with reference to the accompanying drawings, in which:

Fig. 1 is a side elevational view of a fairing for the front wheel of an automobile vehicle, this fairing being made according to the present invention;

Fig. 2 is a sectional view on the line a—a of Fig. 1, with portions in section on the lines b—b and c—c, respectively, of said Fig. 1;

Fig. 3 is a bottom view corresponding to Fig. 1;

Fig. 4 is a sectional view on the line IV—IV of Fig. 2;

Fig. 5 is a sectional view on the line V—V of Fig. 2.

As shown by the drawing, the fairing for wheel 2 of the vehicle is constituted by a stamped metal sheet box 1 carried by the vehicle and provided with a recess 10 in which is housed wheel 2, with the exception of the lower portion thereof.

The lateral wall 11 of this streamlined box is provided with an aperture through which said recess 10 opens laterally to the outside, the edge 3a—3b of this aperture having, in side view (Fig. 1), the shape of a circular arc concentric with wheel 2 (in the normal position thereof) and of a radius slightly greater than said wheel.

When the vehicle is running, the portion 3a of said aperture edge acts in trailing edge fashion with respect to the relative wind resulting from the movement of the vehicle, while portion 3b of this edge acts in leading edge fashion with respect to said relative wind. Trailing edge portion 3a is that running forwardly from point A, located near the top of the aperture. Leading edge portion 3b is that running rearwardly from said point A.

Now, according to an essential feature of my invention, trailing edge portion 3a forms a sharp ridge, whereas leading edge portion 3b is in the form of a convex rounded surface.

The portion 3a which forms a sharp ridge may be constituted by the mere edge of the sheet metal of which box 1 is made. Alternately, and as shown by the drawing, this edge 3a may be obtained by bending this sheet metal at a sharp angle, for instance an acute angle as shown in Fig. 2.

Of course, sharp edge 3a might be constituted by bending the sheet metal so as to form an angle with a rounded apex, the radius of the rounded portion being very small (some millimeters) so as to make it practically equivalent to a sharp edge as far as the effects thereof on the air flow are concerned.

As for edge portion 3b, it is constituted by an outwardly convex curved surface formed by the sheet metal of wall 11 curving inwardly as shown in Figs. 1 and 2.

Cross-sections a, b, c, corresponding to section lines a—a, b—b, c—c of Fig. 1 show that the radius of curvature of said trailing edge portion 3b is the greater as the section line is at a greater distance from point A.

Recess 10 opens downwardly to the outside through an aperture 12, in the bottom wall of box 1, the edge 4a, 4b, 4'a, 4'b of said bottom aperture (Figs. 2 and 3) being made similarly to the edge of the lateral aperture above described.

Edge portions 4a, 4'a (BC, DE on Fig. 3) act in trailing edge fashion with respect to the relative wind produced by the movement of the vehicle. They are made to constitute sharp ridges.

Edge portions 4b, 4'b (CD, EF) act in leading edge fashion with respect to said relative wind and are made to constitute rounded convex surfaces curving upwardly.

Such a fairing produces but a very slight perturbation of the air flow around it, the curved surfaces of the leading edges causing the air streams to follow without eddies the wall of the fairing rearward of said leading edges.

In a general manner, while I have, in the preceding description, disclosed what I deem to be practical and efficient embodiments of the present invention, it should be well understood that I do not wish to be limited thereto as there might be changes made in the arrangement, disposition and form of the parts without departing from the principle of the present invention as comprehended within the scope of the appended claims.

What I claim is:

1. For use on a vehicle, a wheel fairing constituted by a streamlined structure provided with a recess for a portion of a wheel of said vehicle, this recess opening to the outside through at least one aperture in the outer wall of said structure, the edge of said aperture forming a sharp ridge along the portion thereof that constitutes a trailing edge with respect to the relative wind resulting from the movement of said vehicle, and a convex rounded surface along the portion thereof that constitutes a leading edge.

2. For use on a vehicle, a wheel fairing constituted by a streamlined structure provided with a recess adapted to accommodate a portion of a wheel of said vehicle, this recess opening to the outside through at least one bottom aperture in the outer wall of said structure, the edge of said aperture forming a sharp ridge along the portion thereof that constitutes a trailing edge with respect to the relative wind resulting from the movement of said vehicle, and a convex rounded surface along the portion thereof that constitutes a leading edge.

3. For use on a vehicle, a wheel fairing constituted by a streamlined structure provided with a recess adapted to accommodate a portion of a wheel of said vehicle, this recess opening to the outside through a bottom aperture and a lateral aperture in the outer wall of said structure, the edges of said apertures forming sharp ridges along the portions thereof that constitute trailing edges with respect to the relative wind resulting from the movement of said vehicle, and convex rounded surfaces along the portions thereof that constitute leading edges.

4. For use on a vehicle, a wheel fairing constituted by a streamlined sheet metal box provided with a recess adapted to accommodate a portion of a wheel of said vehicle, the outer wall of said box being provided with at least one aperture along the edge of which the sheet metal of said box is made to form a sharp ridge for the portion thereof that constitutes a trailing edge with respect to the relative wind resulting from the movement of said vehicle, and curved inwardly with a convex shape for the portion thereof that constitutes a leading edge.

5. For use on a vehicle, a wheel fairing constituted by a streamlined sheet metal box provided with a recess adapted to accommodate a portion of a wheel of said vehicle, the outer wall of said box being provided with at least one aperture along the edge of which the sheet metal of said box is bent inwardly at sharp angles for the portion thereof that constitutes a trailing edge with respect to the relative wind resulting from the movement of said vehicle, and curved inwardly with a convex shape for the portion thereof that constitutes a leading edge.

JEAN EDOUARD ANDREAU.

REFERENCES CITED

The following references are of record in the file of this patent:

UNITED STATES PATENTS

| Number | Name | Date |
|---|---|---|
| 1,855,761 | Hughes | Apr. 26, 1932 |
| 2,059,305 | Best | Nov. 3, 1936 |
| 2,128,687 | Andreau | Aug. 30, 1938 |

FOREIGN PATENTS

| Number | Country | Date |
|---|---|---|
| 644,810 | Germany | May 13, 1937 |